United States Patent
Notz

(10) Patent No.: US 9,229,439 B2
(45) Date of Patent: Jan. 5, 2016

(54) METHOD AND DEVICE FOR OPERATING A DRIVEN AXLE IN A MACHINE TOOL

(75) Inventor: Markus Notz, Schwändi (CH)

(73) Assignee: NETSTAL-MASCHINEN AG, Näfels (CH)

( * ) Notice: Subject to any disclaimer, the term of this patent is extended or adjusted under 35 U.S.C. 154(b) by 420 days.

(21) Appl. No.: 13/704,903

(22) PCT Filed: Jun. 1, 2011

(86) PCT No.: PCT/EP2011/059101
§ 371 (c)(1),
(2), (4) Date: Dec. 17, 2012

(87) PCT Pub. No.: WO2011/157564
PCT Pub. Date: Dec. 22, 2011

(65) Prior Publication Data
US 2013/0096712 A1    Apr. 18, 2013

(30) Foreign Application Priority Data
Jun. 18, 2010  (DE) .......................... 10 2010 024 246

(51) Int. Cl.
| | |
|---|---|
| G05B 15/02 | (2006.01) |
| B22D 17/20 | (2006.01) |
| B29C 45/17 | (2006.01) |
| B29C 45/50 | (2006.01) |
| B29C 45/76 | (2006.01) |
| B29C 45/82 | (2006.01) |

(52) U.S. Cl.
CPC ............ *G05B 15/02* (2013.01); *B22D 17/2015* (2013.01); *B29C 45/17* (2013.01); *B29C 45/5008* (2013.01); *B29C 45/76* (2013.01); *B29C 2045/1792* (2013.01); *B29C 2045/5068* (2013.01); *B29C 2045/7673* (2013.01); *B29C 2045/824* (2013.01); *B29C 2945/76692* (2013.01); *F15B 2211/20569* (2013.01); *F15B 2211/212* (2013.01); *F15B 2211/41518* (2013.01); *F15B 2211/88* (2013.01)

(58) Field of Classification Search
USPC ......... 700/160; 264/328.1; 425/542, 582, 589
See application file for complete search history.

(56) References Cited

U.S. PATENT DOCUMENTS

| | | | | |
|---|---|---|---|---|
| 4,527,244 | A | * | 7/1985 | Graham et al. ................ 700/186 |
| 4,574,666 | A | * | 3/1986 | Habegger ........................ 82/127 |

(Continued)

FOREIGN PATENT DOCUMENTS

| | | |
|---|---|---|
| DE | 29 42 866 | 5/1981 |
| DE | 694 33 658 | 2/1995 |

(Continued)

*Primary Examiner* — Kidest Bahta
(74) *Attorney, Agent, or Firm* — Henry M. Feiereisen LLC

(57) ABSTRACT

In a device and a method for operating a driven axle in a machine tool, in particular in an injection-molding machine, at least two different drives are coupled to form a common effective drive, wherein the performance and energy consumption data for each drive are stored in the form of characteristic values or characteristic curves. To use the effective drive as optimally as possible in terms of energy, it is proposed to determine the performance requirement for the driven axle, to determine the particular operational combination of the different drives that requires the least expenditure of energy based on the determined performance requirement and to drive the drives with the determined particular operational combination.

14 Claims, 4 Drawing Sheets

(56) References Cited

U.S. PATENT DOCUMENTS

| | | | | |
|---|---|---|---|---|
| 4,770,621 | A * | 9/1988 | Groebli et al. | 425/150 |
| 5,576,613 | A * | 11/1996 | Yang | 322/16 |
| 5,644,220 | A * | 7/1997 | Urs et al. | 324/71.3 |
| 5,792,482 | A * | 8/1998 | Yamamoto | 425/116 |
| 6,299,427 | B1 * | 10/2001 | Bulgrin et al. | 425/145 |
| 6,682,334 | B2 * | 1/2004 | Becker et al. | 425/214 |
| 7,306,447 | B2 * | 12/2007 | Dantlgraber | 425/145 |
| 8,293,163 | B2 * | 10/2012 | Huang et al. | 264/328.1 |
| 2005/0258795 | A1 * | 11/2005 | Choi | 318/625 |
| 2008/0199556 | A1 * | 8/2008 | Dantlgraber | 425/542 |
| 2010/0283186 | A1 | 11/2010 | Notz | |
| 2011/0293773 | A1 * | 12/2011 | Hehl et al. | 425/547 |

FOREIGN PATENT DOCUMENTS

| | | |
|---|---|---|
| DE | 103 00 042 | 1/2005 |
| EP | 1 769 898 | 5/2010 |
| JP | 2003-231153 | 8/2003 |
| WO | WO 2005/110711 | 11/2005 |

* cited by examiner

METHOD AND DEVICE FOR OPERATING A DRIVEN AXLE IN A MACHINE TOOL

CROSS-REFERENCES TO RELATED APPLICATIONS

This application is the U.S. National Stage of International Application No. PCT/EP2011/059101, filed Jun. 1, 2011, which designated the United States and has been published as International Publication No. WO 2011/157564 and which claims the priority of German Patent Application, Serial No. 10 2010 024 246.2, filed Jun. 18, 2010, pursuant to 35 U.S.C. 119(a)-(d).

BACKGROUND OF THE INVENTION

The present invention pertains to a method for operating a driven axle in a machine tool, in particular an injection molding machine, wherein at least two different drives are coupled into a common effective drive, as well as to a device for operating a driven axle in a machine tool.

Machine tools such as, among other things, injection molding machines typically feature several driven axles that in some instances have very high and different load ranges. In an injection molding machine, for example, the injection process, i.e., the process, in which the molten material is conveyed into the cavity of the tool, is the process with the most variable requirement. In this case, an extreme speed range and pressure range needs to be controlled depending on the respective application. Injection speeds from a few tenths of a millimeter per second up to 1 meter per second are required. With respect to the load range, the requirements may lie between less than 100 bar and more than 2,000 bar. On extreme examination, the performance requirement therefore varies by up to a factor of 20,000. If this broad scope of applications should be covered with today's conventional drive arrangements, the power cannot be made available in an energetically optimal fashion, at least not in all applications. For example, high peak powers can only be made available directly by a hydraulic pump (e.g., variable displacement or fixed displacement pump) up to a certain power limit. Beginning at a certain power limit, an intermediate storage is required (e.g., by means of a hydraulic accumulator) and the power is then obtained from such a storage.

SUMMARY OF THE INVENTION

It is the objective of the present invention to disclose a common drive for a driven axle in a machine tool and a method for its operation that respectively make it possible to cover the broadest performance range possible with a predetermined performance profile (e.g., as energy-efficient as possible).

According to one aspect of the present invention, at least two different drives are coupled into a common effective drive, wherein the performance data for each drive is stored in the form of characteristic values or characteristic curves (in this case, the term performance data refers to all characteristic data and consumption data of the respective drive). Three or more drives preferably may also be "interconnected." According to the invention, the performance requirement for a driven axle is determined and a performance profile is specified. For example, the lowest energy consumption possible or the lowest energy consumption possible for certain minimum dynamics of the common drive, etc., may be specified as performance profile. The operational combination of the drives that fulfills the specified profile as optimally as possible is determined based on the performance requirement. The drives are then driven with the determined operational combination.

According to the present invention, drives with different technical characteristics and peculiarities can be interconnected. For example, an electric machine in the form of an electric motor may be coupled to a hydraulic cylinder that is driven by a hydraulic pump and/or a hydraulic accumulator. The combination of hydraulic cylinder and coupled electric machine then acts upon the drive axle. The pump, as well as the accumulator, acts upon a piston of the hydraulic cylinder, particularly a double-action piston (also synchronizing or differential cylinder), wherein particularly this piston is in turn connected to the electric drive.

During the operation of the common drive, it is possible to realize different combinations of the individual interconnected drives. For example, it is possible to activate the electric drive only and to switch the other (hydraulic) drives into an inactive or idle mode. Alternatively, only the hydraulic pump may be activated and the other drives may be once again switched into an idle mode. According to a third embodiment, the accumulator can be actuated by itself. However, operational combinations of the aforementioned individual drives can also be realized, namely the combination of an active accumulator with an active motor or the combination of an active accumulator with an active pump or the combination of an active motor with an active pump. According to the seventh embodiment, a simultaneous combination of an active accumulator, an active motor and an active pump can also be realized. Consequently, seven different optional combinations are available with respect to the drive.

These alternatives multiply if provisions are made for operating the electric machine in the form of an electric motor, as well as in the form of a generator, and for not only operating the hydraulic element in the form of a pump, but also in the form of a hydraulic motor. In this case, there are two more subcombinations for the combination of an active accumulator and an active motor, likewise two more subcombinations for the combination of an active accumulator and an active pump, four subcombinations for the combination of an active motor and an active pump and likewise four subcombinations for the combination of an active accumulator, an active motor and an active pump, i.e., altogether 16 different optional combinations for the operation of the above-described common drive.

In the presently described example relating to three individual drives with accumulator, the characteristic values of the accumulator can be quasi-shifted depending on the operating mode of the electric machine and the hydraulic element, namely the respective driving mode or regenerative mode. This is described in greater detail below with reference to an exemplary embodiment.

In addition to the aforementioned hydraulic accumulators, hydraulic pumps and electric drives, other drives such as high-torque motors, linear drives, etc., may also be considered as drives. The optional combinations and the variability change accordingly depending on the respective combination.

If the electric machine that makes it possible to realize an electric motor is also designed such that it can be operated in the form of a generator, excess energy can be converted into electric energy in the regenerative mode and fed back into the system. This applies analogously if the hydraulic element that acts as a pump can also be operated in the form of a hydraulic motor. If this hydraulic motor is coupled to another electric machine that in turn can be operated in the form of a generator, it is also possible to generate electric energy in the regenerative mode and to feed this electric energy back into the system.

BRIEF DESCRIPTION OF THE DRAWING

One concrete exemplary embodiment of the present invention is described in greater detail below with reference to the attached drawings. In these drawings

DETAILED DESCRIPTION OF PREFERRED EMBODIMENTS

Figure 1:
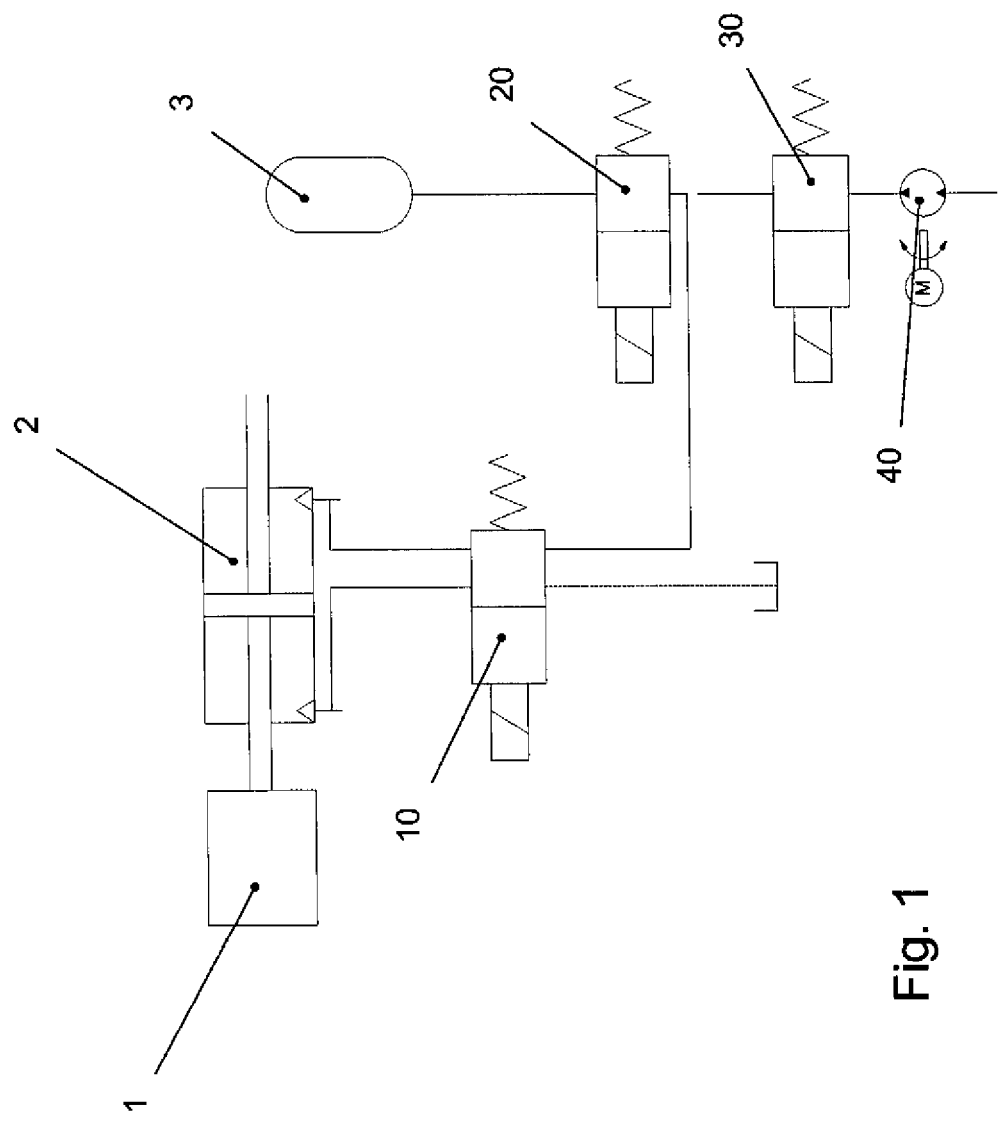
FIG. 1 shows a schematic block diagram of one concrete design of the present invention.

FIG. 1 shows a common drive for a driven axle, namely the axial drive for an injection unit of an injection molding machine, that is comprised of three different drive components.

In this case, the (not-shown) driven actuating element (e.g., the injection screw or the injection piston) of the driven axle is connected to the piston rod of a double-action piston shown that is accommodated in a hydraulic piston and forms a hydraulic piston-cylinder unit 2. This unit features two hydraulic pressure chambers to both sides of the double-action piston. The piston is presently non-positively connected to the electric machine.

This electric machine 1 may be realized in the form of a unit including a stator and a rotor that can be operated in the form of a motor and in the form of a generator, wherein said unit acts upon the piston rod via a gear (e.g., rack-and-pinion combination or nut-spindle combination) and is functionally connected to this piston rod.

The pressure chambers of the piston-cylinder unit 2 can be acted upon with hydraulic fluid via an intermediately arranged valve 10 (e.g., proportional valve, servo valve or switching valve). The hydraulic fluid may originate from a pump 40 that is driven by a variably controllable motor. In addition, the pump 40 may also operate in the form of a hydraulic motor, wherein the motor connected to the pump 40 then operates in the form of a generator.

The hydraulic pump 40 may be optionally connected to the valve 10 via another intermediately arranged valve 30.

Furthermore, a hydraulic accumulator 3 is provided, in which hydraulic fluid can be stored in pressurized form. This accumulator 3 is respectively connected to the valves 30 and 10 via a third valve 20 as illustrated in FIG. 1.

In this way, different options for producing connections between the pressure chambers of the piston-cylinder unit 2, the accumulator 3 and the pump 40 are created depending on the position of the valves 10, 20 and 30. For example, if the valves 20 and 30 are positioned in such a way that the accumulator 3 is fluidically connected to the pump, the pump could charge the accumulator on the one hand and the accumulator could drive the pump in the form of a generator on the other hand. If the valves 20 and 30 on the one hand and the valve 10 on the other hand are positioned accordingly, the pump 40 can selectively drive the double-action piston of the piston-cylinder unit 2 or charge the accumulator 3. If the valves 10, 20 and 30 are positioned accordingly, the pump 40 and the accumulator 3 can simultaneously act upon the double-action piston in the same direction.

Depending on the switching position of the valves, it is therefore possible to drive the not-shown injection unit with only the electric machine 1 that operates in the form of an electric motor, with only the pump 40, with only the accumulator or with a combination of two individual drives or a combination of all individual drives. In addition, the electric machine and the hydraulic element can be operated in a regenerative mode.

Consequently, it is possible to optimally fulfill the determined performance requirement for a driven axle with a different combination of the individual drives. Depending on the type of combination, more or less energy is consumed in this case. For example, if excess energy is fed back into the system (e.g., into an intermediate circuit) by the electric machine that operates in the form of a generator in the accumulator mode, energy waste can be avoided and the efficiency of the drive therefore can be increased. The system, particularly the (presently not-shown) control unit that correspondingly acts upon the individual drives, determines the most favorable operational combination for the performance requirement in accordance with the performance profile from the stored performance data. The individual drives are then correspondingly acted upon or operated in the regenerative mode with the determined operational combination.

Figure 4:
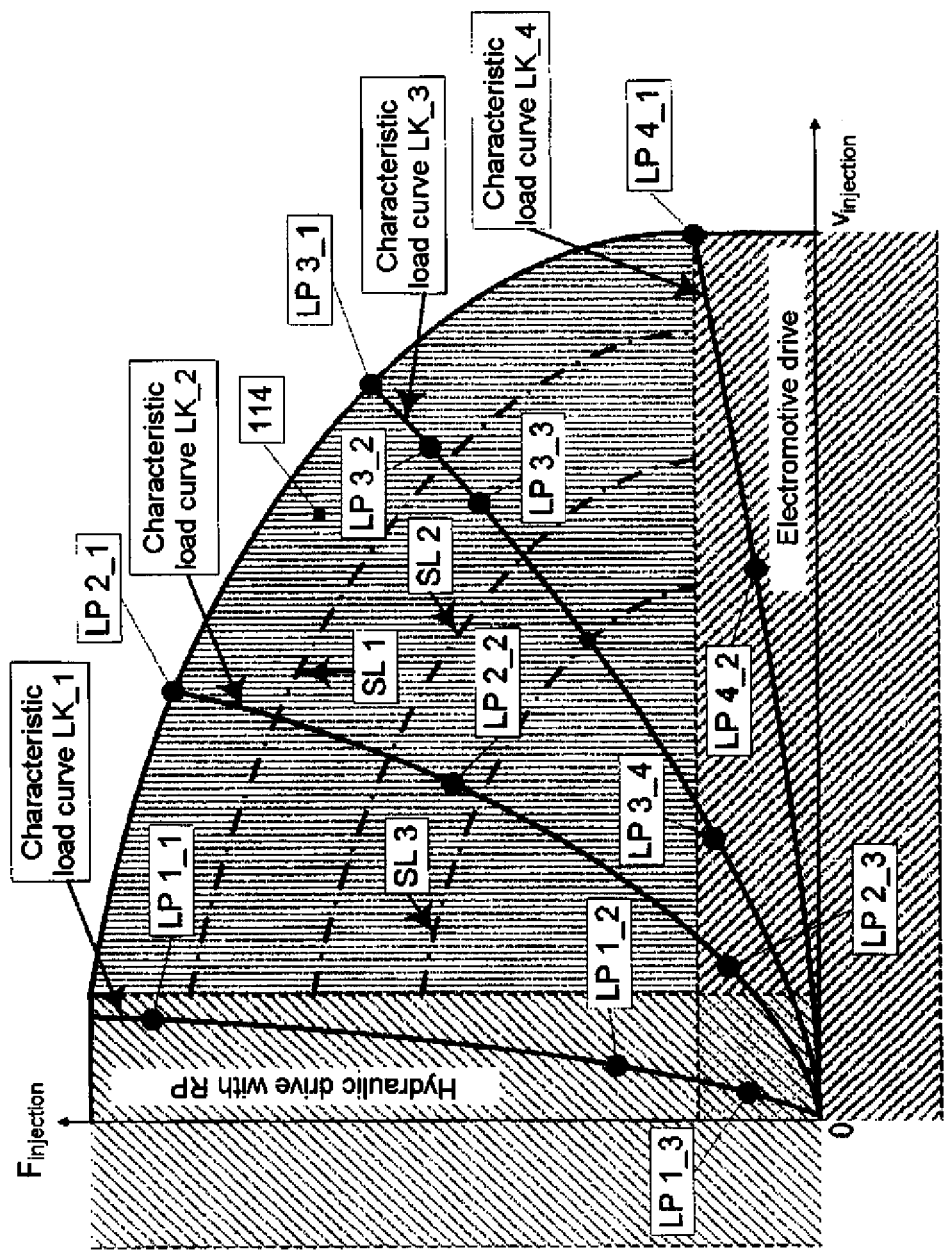
FIG. 4 shows a diagram for describing the different load ranges of an injection device according to the concrete embodiment in FIG. 1 in an injection molding machine.

The effect of the combination of the individual drives with respect to the coverage of the load points is elucidated in greater detail in FIG. 4. In this case, the load points may correspond to the performance requirements.

Figure 2:
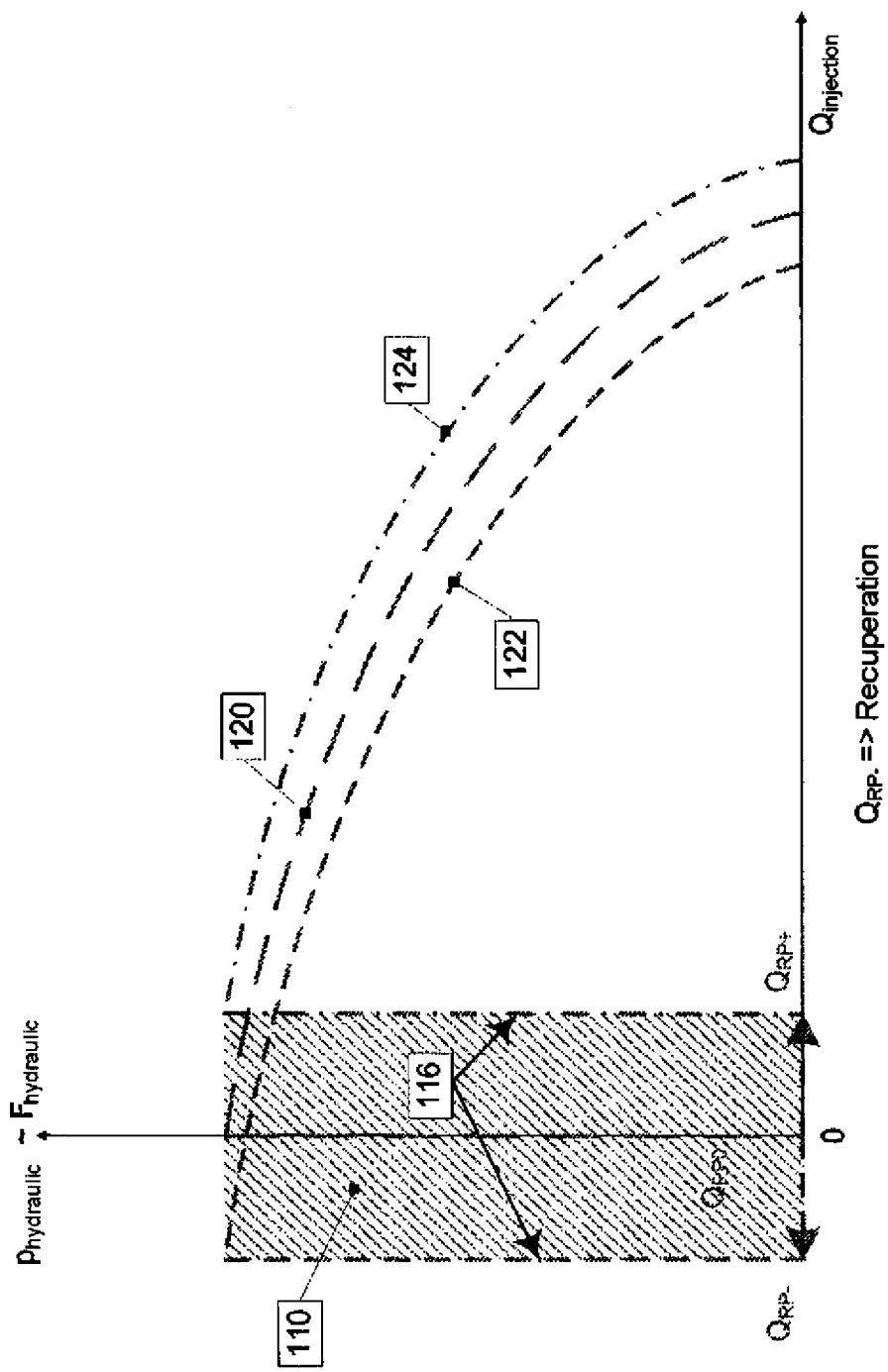
FIG. 2 shows a diagram for describing the different characteristic system pressure curves in dependence on the variable displacement pump according to the concrete embodiment in FIG. 1 in an injection molding machine.
Figure 3:
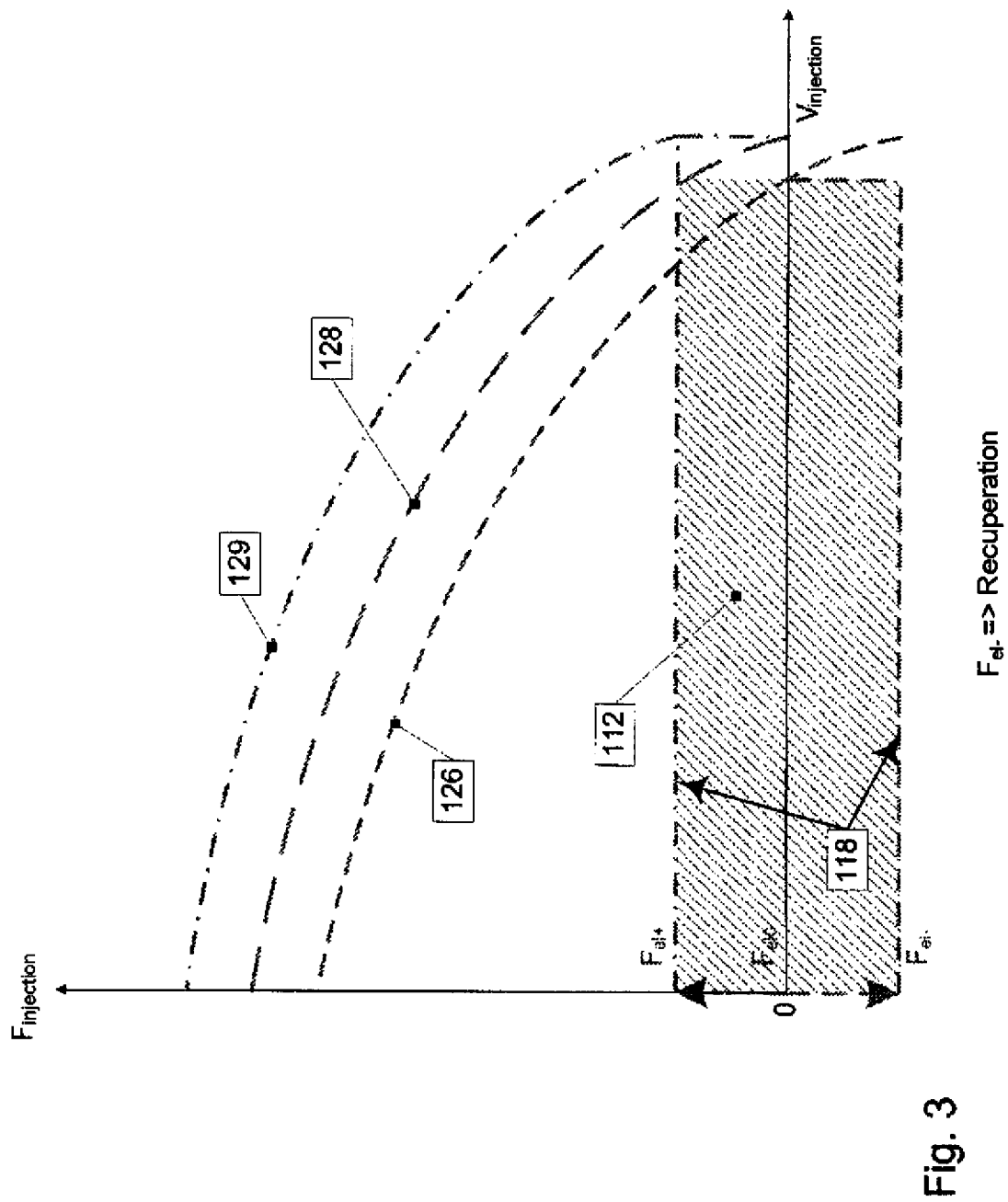
FIG. 3 shows a diagram for describing the different characteristic injection force curves in dependence on the electric machine according to the concrete embodiment in FIG. 1 in an injection molding machine.

In the diagrams illustrated in FIG. 2, FIG. 3 and FIG. 4, either the injection speed v or the proportionally dependent volumetric flow rate Q is plotted on the abscissa and the injection force F or the proportionally dependent hydraulic pressure p is plotted on the ordinate, wherein different load points are illustrated on the characteristic load curves LK_1, LK_2, LK_3 and LK_4 (in FIG. 4). Depending on the area of the diagram, in which a load point is located, this load point is in a range, in which it can be covered by one or a combination of the individual drives (subdrives) according to FIG. 1.

For example, the hatched area 110 of the diagram (FIG. 2) represents the range that can be covered with the operation of only the hydraulic pump or only a variable displacement pump 40. In this case, the load point LP 1_1 (FIG. 4) is covered by the variable displacement pump 40 in the direct mode at full pressure. The required oil flow approximately amounts to 90% of the capacity of the variable displacement pump. This marks the performance limit of the variable displacement pump 40. The throughput of the hydraulic fluid can be achieved, for example, by adjusting a pivoting angle in a corresponding variable displacement pump, as well as by controlling the speed of a driving electric motor. A very good energy efficiency is achieved in this case, namely with a control of the pivoting angle, as well as with a control of the speed of the electric motor. Consequently, hardly any throttling losses occur.

The load point LP 1_2 (FIG. 4) likewise can be covered with only the variable displacement pump 40 in the direct mode at a reduced pressure. In this case, the oil flow approximately lies at 40% of the capacity of the variable displacement pump. The reduced throughput once again can be achieved by adjusting the pivoting angle, as well as by reducing the speed of the electric motor driving the pump. In this case, different energy consumption values can be achieved with the adjustment of the pivoting angle or with the reduced speed of the electric motor.

The hatched area 112 (FIG. 3) in the diagram can be directly covered by means of the electric machine 1 that operates in the form of an electric motor. This figure shows that the load point LP 1_3 (FIG. 4) can be covered with only the electric machine 1, as well as with only the variable displacement pump 40. The efficiency hardly differs in this case.

The load points LP 4_1, LP 4_2, LP 3_4, LP 1_3 and LP 2_3 can be covered with only the electric machine 1.

For all remaining load points, the accumulator 3 in the form of an energy storage needs to be added in a common drive according to the embodiment illustrated in FIG. 1. However, the characteristic curves can be shifted in the diagram during operation of the accumulator 3 due to the different operating mode (driving or regenerative mode) of the hydraulic element 2, as well as due to the different operating mode (driving or regenerative mode) of the electric machine 1.

For example, the different mode of the variable displacement pump causes a shift of the zero point of the speed axis for the accumulator. Without the operation of the pump, the characteristic accumulator curve is identified by the characteristic curve 120 (FIG. 2). Due to the throttling losses in the hydraulic lines, the characteristic curve decreases with the injection speed v. If the variable displacement pump 40 is now added as a drive, the characteristic curve is shifted toward the right in the diagram (to the characteristic curve 124 in FIG. 2). If the variable displacement pump is operated in the form of a hydraulic motor, the accumulator additionally drives the hydraulic element such that the characteristic curve is shifted toward the left (characteristic curve 122 in FIG. 2). In the latter instance, the hydraulic power of the accumulator 3 is not only made available to the piston-cylinder unit 2, but also to the variable displacement pump 40 that now operates in the form of a hydraulic motor.

The characteristic curve of the accumulator 3 is analogously shifted upward or downward in the diagram if the electric machine 1 is added. The power of the electric motor or the power of the electric machine that operates in the form of a generator is added to or subtracted from the power of the accumulator exerted upon the piston such that the characteristic accumulator curve is in dependence on the operating mode of the electric motor not shifted (FIG. 3, characteristic curve 128), shifted upward if the electric machine operates in the form of a motor (FIG. 3, characteristic curve 129) and shifted downward if the electric machine operates in the form of a generator (FIG. 3, characteristic curve 126). In this respect, the different load points can be covered differently in dependence on the combination of the drives.

The load points LP 2_1, LP 3_1 (FIG. 4) can only be covered with maximum utilization of the system. This means that all three available subdrives need to jointly generate and feed power into the system. In other words, this means that the electric machine 1 operates in the form of an electric motor, the accumulator 3 serves for acting upon the piston in the same direction and the hydraulic element operates in the form of a variable displacement pump 40 (SL1, SL2, SL3 are illustrated in FIG. 4 as possible characteristic system performance curves in different operating modes of the components).

As the injection speed increases, it is unavoidable that the throttling losses also increase such that the energy efficiency deteriorates. However, it is usually impossible or at least very difficult for individual systems to yield these aforementioned performance requirements.

The load point LP 2_2 can only be covered with the assistance of the accumulator 3. In order to maintain the throttling losses in the accumulator as low as possible, however, an additional load is generated with the electric machine 1 that operates in the form of an electric motor in order to increase the load to the highest level possible (regenerative mode of the electric machine 1). The thusly obtained electric energy can be fed back into an intermediate circuit. This returned energy could be used, e.g., during the injection process for charging the accumulator by means of the variable displacement pump or for directly driving other machines connected to the intermediate circuit or also be fed back into the power grid. In this method, the throttling losses remain low in this operating point. The occurring losses correspond to the efficiencies of the respective energy conversions.

The load point LP 3_3 also lies in an area of the diagram, in which the assistance of the accumulator 3 is required. The throttling losses caused by the valves can be minimized by switching the variable displacement pump into the regenerative mode (hydraulic motor function).

The load point LP 3_2 ultimately also needs to be covered with the assistance of the accumulator 3. In addition, a remaining portion of the required power needs to be generated, for example, with the electric machine 1 that operates in the form of an electric motor. This remaining portion should once again only be so large that the throttling losses caused by the valve are maintained at a minimum.

The present invention and the above-described method make it possible to realize a common drive with very high energy efficiency, wherein the respective strengths of the respectively active subdrive (dynamics, accuracy) can be utilized. The regenerative use of the electric machine and of the hydraulic element, in particular, makes it possible to keep the energy that is otherwise lost during the operation of the accumulator within the system.

All in all, there only remains a small area of the diagram that cannot be ideally adapted to a desired performance profile (in this case energy efficiency).

The system furthermore allows a modular design. For example, only the operation of the variable displacement pump can be directly utilized for low speed requirements. The electric drive system, in contrast, can be utilized for lower torque requirements with high speed. The storage system with the accumulator optionally needs to be added for high peak powers.

When the injection molding machine is ordered, the systems initially may only be sold individually (e.g., only a hydraulic drive). However, the injection molding machine can be retrofitted with other subdrives. The above-described concept may, in principle, also be expanded to other drive axles or drive elements. With respect to the drive axles, a corresponding concept could be used in an injection molding machine, for example, for the closing force, for the contact pressure, etc.

The invention claimed is:

1. A method for operating a driven axle in a machine tool, in particular an injection molding machine, wherein at least two different drives operate according to different technical principles and are interconnected to form a common effective axial drive for the driven axle, comprising:
storing performance data for each of the at least two different drives in the form of characteristic values or characteristic curves,
specifying a performance profile for the effective drive,
determining a performance requirement for the driven axle, based on the performance requirement, determining from the stored performance data an operational combination of the at least two different interconnected axial drives that produces the performance profile, and operating the at least two different interconnected axial drives with the determined operational combination.

2. The method of claim 1, wherein the specified performance profile has a lowest possible energy consumption.

3. The method of claim 2, wherein the specified performance profile has lowest possible energy consumption commensurate with a predetermined minimum dynamics.

4. The method of claim 1, wherein at least one drive of the at least two different interconnected axial drives is embodied as an electric machine which operates as a drive motor or as a generator depending on a respective requirement.

5. The method of claim 4, wherein electric energy is generated and fed back into a system when the electric machine operates as a generator.

6. The method of claim 1, wherein at least one drive of the at least two different interconnected axial drives comprises a hydraulic element which is actuated by a valve and operates as a driven pump or as a hydraulic motor depending on a respective requirement.

7. The method of claim 6, wherein the hydraulic element operating as a hydraulic motor drives another electric machine embodied as a generator that generates electric energy and feeds the generated electric energy back into a system.

8. A device for operating a driven axle in a machine tool, in particular an injection molding machine, comprising:

at least two different drives operating according to different technical principles and interconnected to form a common effective axial drive for the driven axle, a storage device for storing performance data for each of the at least two different interconnected axial drives in the form of characteristic values or characteristic curves, and a control unit operatively connected to the at least two different interconnected drives and controlling the at least two different interconnected axial drives commensurate with a specified performance profile for the effective drive, wherein the control unit is configured to determine a performance requirement for the driven axle, based on the performance requirement, determine from the stored performance data an operational combination of the at least two different interconnected axial drives that produces the performance profile, and operate the at least two different interconnected axial drives with the determined operational combination.

9. The device of claim 8, wherein at least one drive of the at least two different interconnected axial drives comprises a hydraulic accumulator, and a valve controlling the hydraulic accumulator.

10. The device of claim 8, wherein at least one drive of the at least two different interconnected axial drives comprises an electric machine constructed to operate both as a motor and as a generator.

11. The device of claim 10, wherein the electric machine operating as a generator and components of the electric machine operating as a generator are constructed to feed electric energy back into a system.

12. The device of claim 8, wherein at least one drive of the at least two different interconnected axial drives comprises a hydraulic element constructed for operation as a driven pump or as a hydraulic motor depending on a respective requirement.

13. The device of claim 12, further comprising an additional electric machine, wherein the hydraulic element is coupled to the additional electric machine.

14. The device of claim 13, wherein the additional electric machine and components of the additional electric machine are constructed to feed electric back into a system.

* * * * *